Nov. 8, 1927.

C. PULLIAM 1,648,027

TRANSMISSION MECHANISM

Filed Dec. 22, 1924    6 Sheets-Sheet 1

Inventor

Clarence Pulliam

By Barthel & Barthel
Attorneys

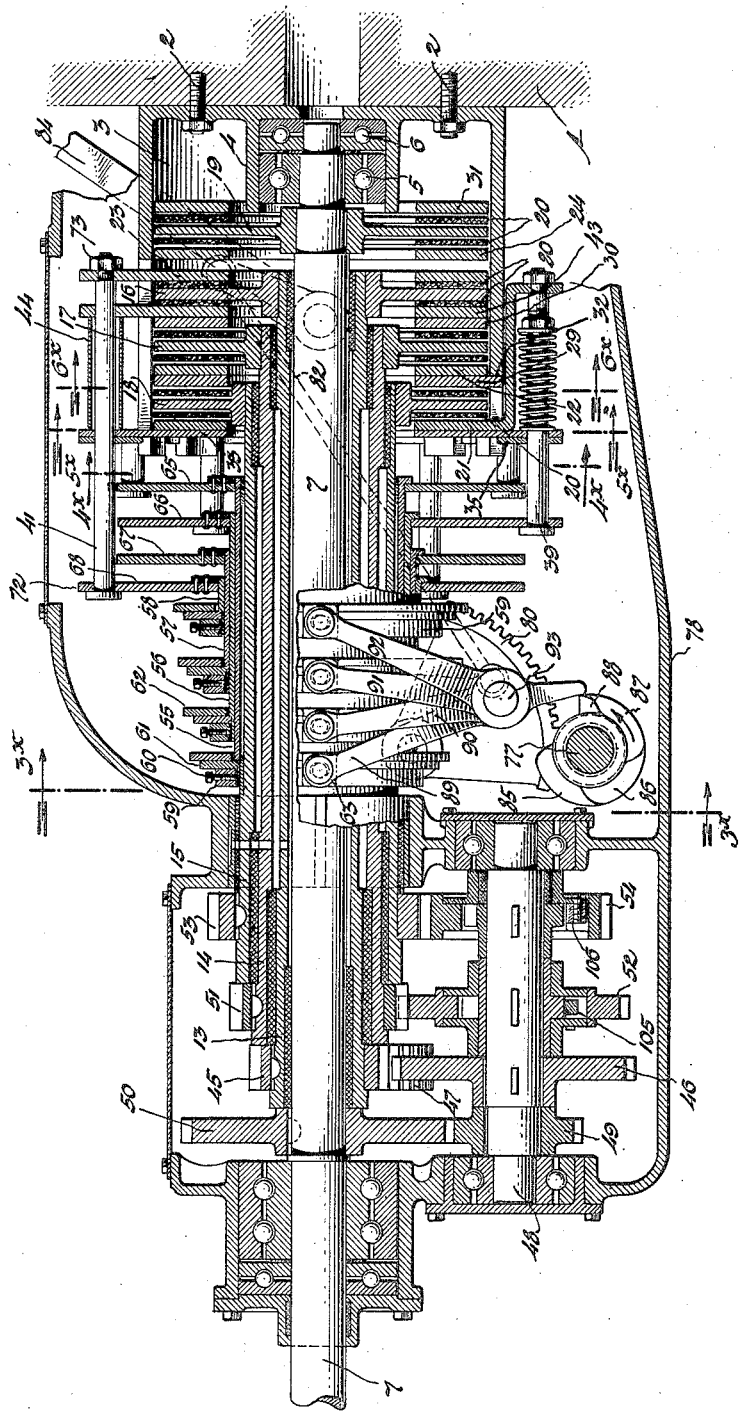

Nov. 8, 1927.  
C. PULLIAM  
1,648,027  
TRANSMISSION MECHANISM  
Filed Dec. 22, 1924   6 Sheets-Sheet 3
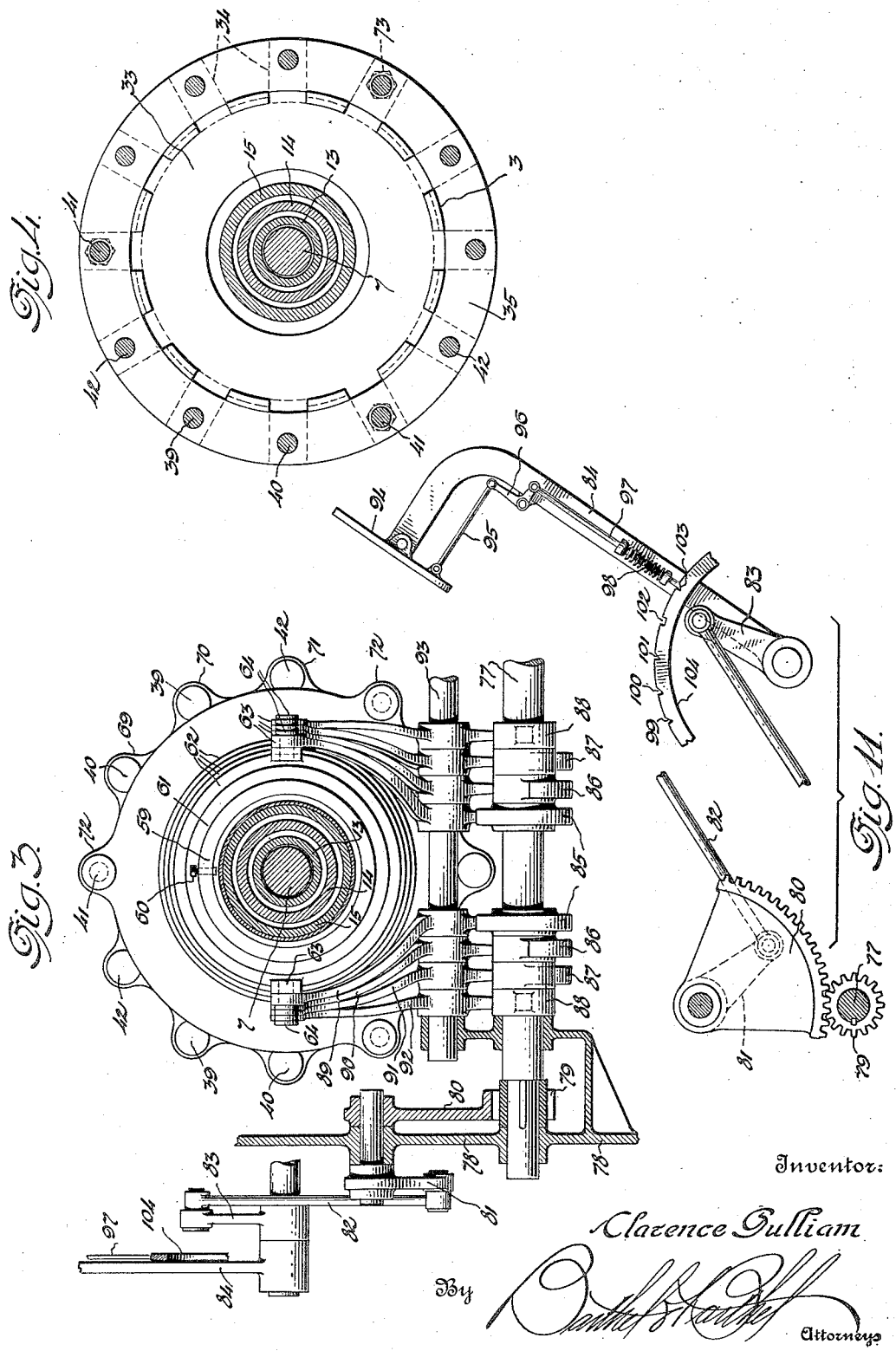
Inventor:  
Clarence Pulliam  
By  
Attorneys

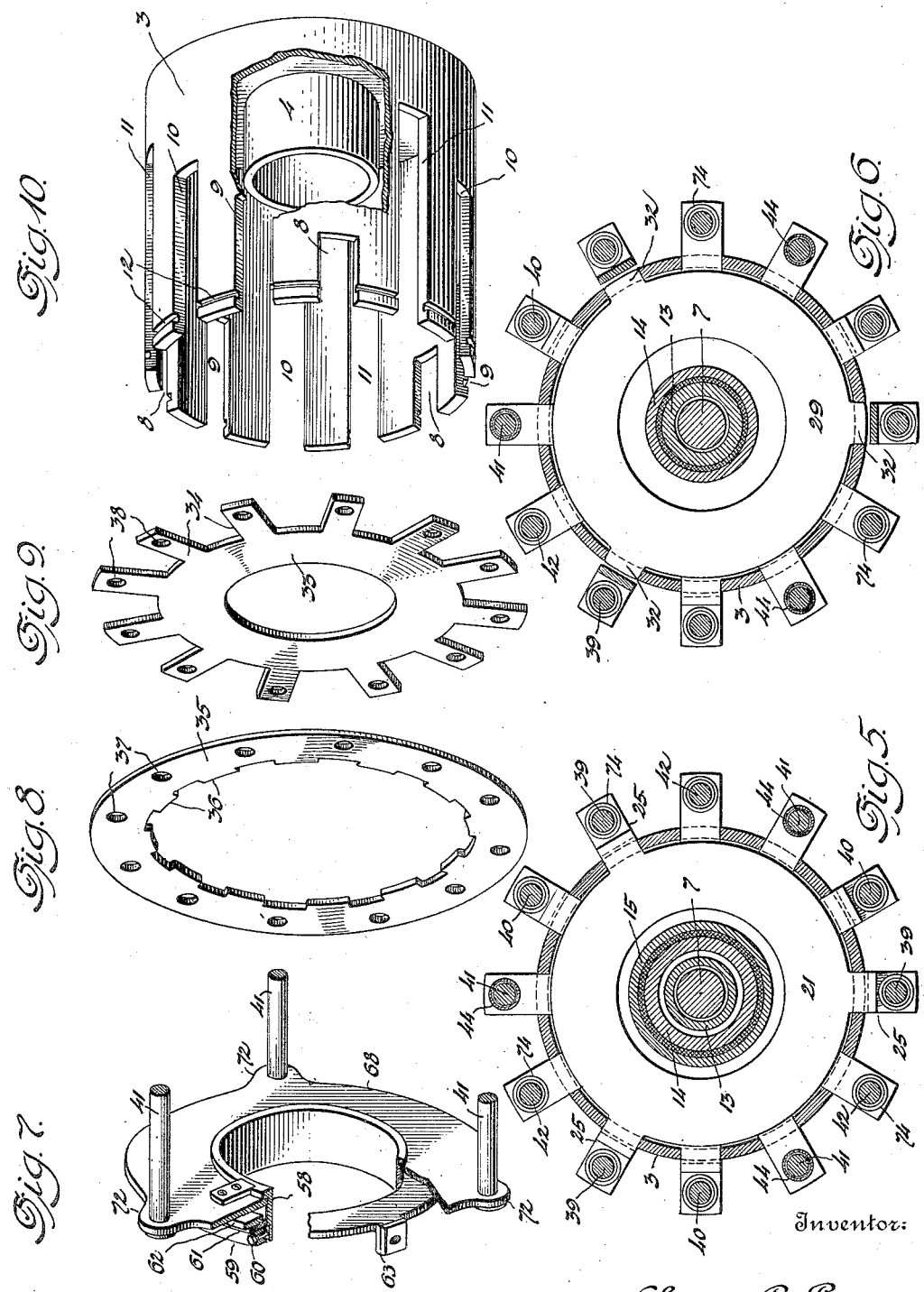

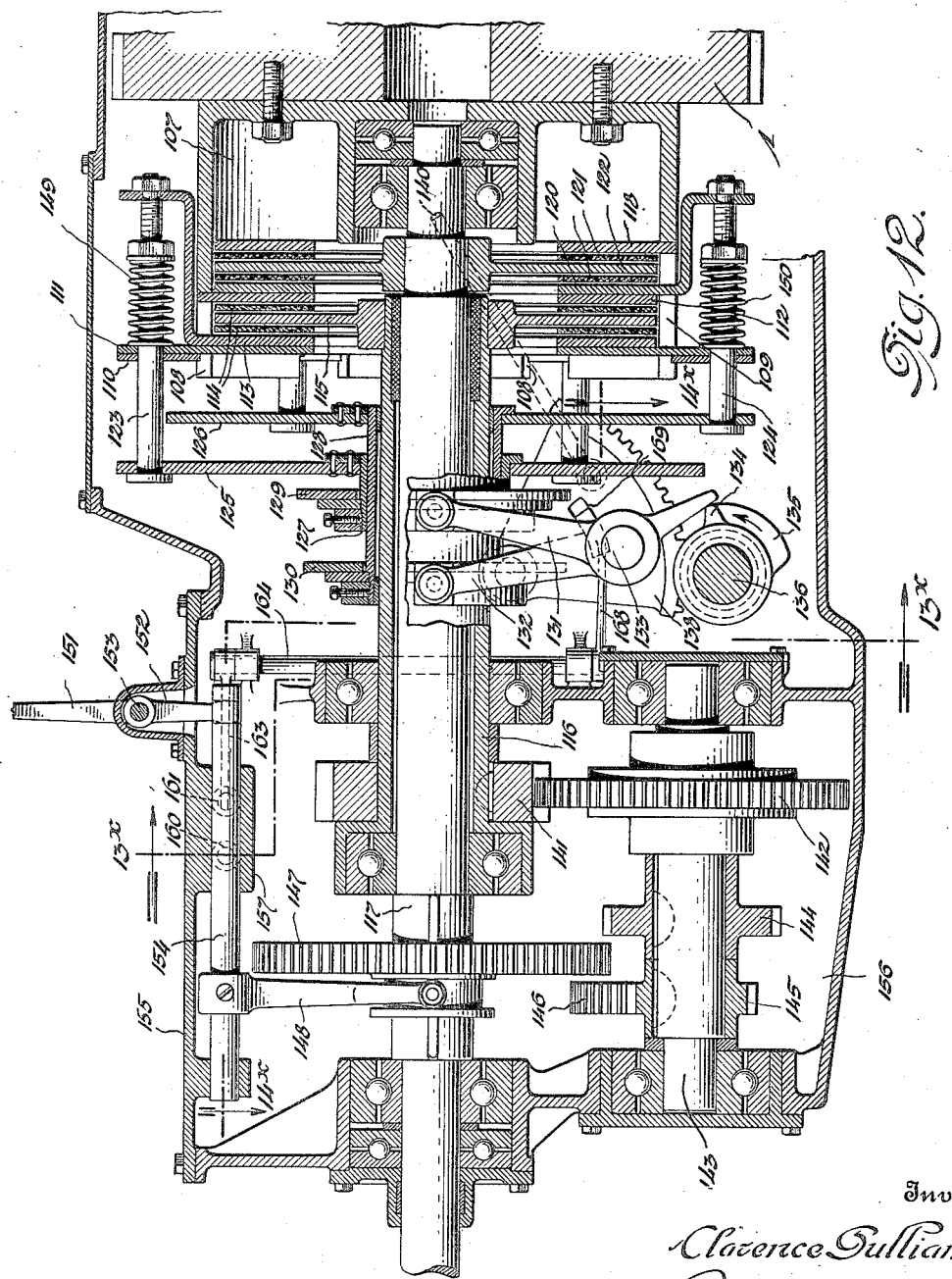

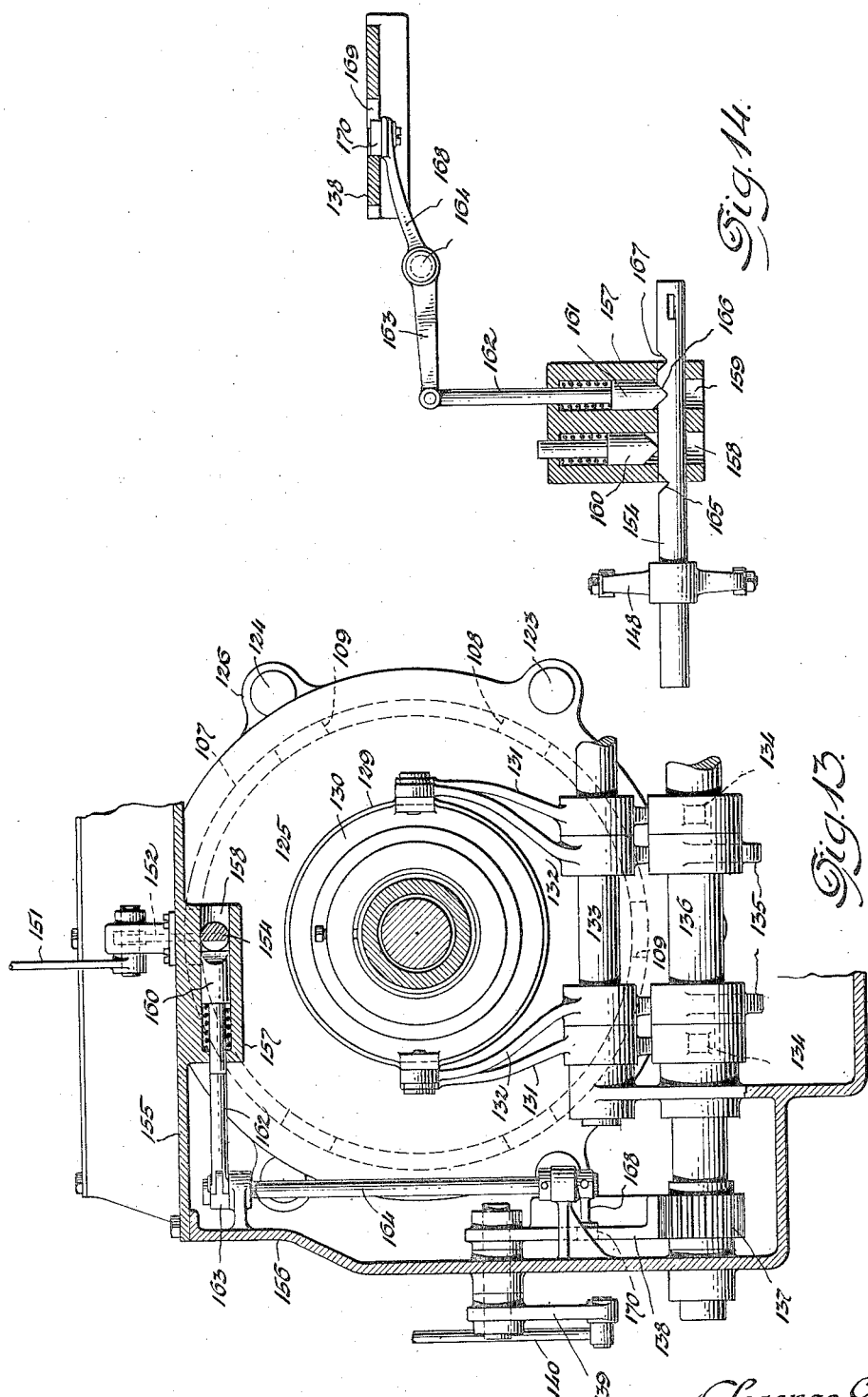

Patented Nov. 8, 1927.

1,648,027

UNITED STATES PATENT OFFICE.

CLARENCE PULLIAM, OF DETROIT, MICHIGAN.

TRANSMISSION MECHANISM.

Application filed December 22, 1924. Serial No. 757,402.

This invention has reference to transmission mechanisms, suitable more particularly for use in connection with heavy motor vehicles such as trucks or tractors, although it is equally applicable to lighter vehicles such as pleasure cars and for marine purposes as well as for the transmission of power in connection with stationary power plants where changes of gear ratio in such transmissions are desirable.

One of the common objections to transmission mechanisms involving the use of change speed devices is the uncoupled interval usually necessary when the change of speed is being effected, whereby temporarily the source of power is disconnected from a driven element resulting in a certain lack of control during such interval and also in the requirement of the exercising of a particular judgment in the timing of the declutching operation, the changing of the gear ratio, and the reclutching operation. Such systems also are subject to the disadvantage that lack of judgment in such timing, and also in appreciating the most desirable engine speed for the effecting of a change of gears, is liable to result in damage to the transmission mechanism or to other parts of the driving or driven elements.

This invention therefore aims to overcome such objectionable features associated with transmission mechanisms of the type referred to by the provision of a mechanism wherein a constant meshing of gears is maintained throughout a gear changing operation and a constant drive is also maintained by the use of a plurality of clutches, one or other of which is maintained in operation irrespective of certain declutching operations which are effected for the purpose of permitting a change of gear ratio in the transmission, except insofar as the obtaining of a neutral condition of the clutch mechanism is provided for.

The invention also has as an object the reduction of the tendency to slip a clutch prior to, during, or subsequent to a gear changing operation such as frequently occurs in mechanisms as heretofore used to the detriment of a clutch and also often to the detriment of the engine with which it is associated.

A still further object of the invention is to provide a device wherein a plurality of gear trains of varying ratio are provided and a clutch is also provided associated with each of the gear trains together with selective mechanism adapted to bring into operation one or other of the clutches according to the gear ratio desirable, and ratchet means, whereby the gears of such plurality of trains are maintained in constant mesh for the purpose of obtaining a continuous driving action, and a consequent object is to obviate the necessity of providing and utilizing a gear shifting mechanism.

It is also an object of the said invention to provide for the control of a plurality of gear trains in a manner permitting their selection by means of a single pedal, lever or operating device whereby a simplicity of control is obtained; and still further objects subsidiary to, or resulting from the aforesaid objects, or from the construction or operation of the invention as it may be carried into effect, will become apparent as the said invention is hereinafter further disclosed.

In carrying said invention into effect, I may provide a plurality of suitably housed clutches, each of which is connected by tubular shafts arranged one within the other with the driving gears of a plurality of gear trains including ratchet gears, whereby all of said trains may simultaneously operate, cam operated clutch actuating members sleeved around said shafts and adapted by the actuation of the cams to select and bring into operation one or other of said clutches for the purpose of determining the driving relation of one or other of the trains of gears whereby changes of gear may be effected, and a cam operating lever adjustable to various positions to effect the operation of said selecting means.

The series of gear trains may for many purposes of power transmission include all of the forward and reverse gear ratios desirable, although in many cases it may be preferred to include only a certain series of gear ratios in the described unit as controlled by a single lever, a further series of gear trains being adapted to be brought into operation by a supplementary gear engaging mechanism, such further gear trains being however adapted to be controlled by the clutches associated with the primary gear trains already referred to.

All of which is more particularly described and ascertained hereinafter, by way of example, having reference to the accompanying drawings, wherein Figure 1 is a plan view of a transmission mechanism embodying the said invention, parts of the casing and mechanism exterior of the main part of the said mechanism being illustrated in a fragmentary manner only;

Figure 2 is a vertical longitudinal section of the said transmission mechanism, partly shown in elevation and with the casing and operating lever broken away;

Figure 3 is a fragmentary transverse section taken on the line 3×—3×, Figure 2;

Figure 4 is a section taken on the line 4×—4× of Figure 2, illustrating in end elevation the clutch housing;

Figure 5 is a transverse section taken on the line 5×—5× of Figure 2;

Figure 6 is a transverse section taken on the line 6×—6× of Figure 2;

Figure 7 is a fragmentary perspective detail view of the reverse clutch selector plate and parts associated therewith;

Figure 8 is a perspective detail view of the clutch housing locking ring;

Figure 9 is a similar perspective view of the clutch housing end plate;

Figure 10 is a perspective view partly broken away of the clutch housing;

Figure 11 is a detail view of the cam operating mechanism including the clutch pedal;

Figure 12 is a vertical longitudinal section partly shown in elevation, with the casing and operating lever broken away illustrating a modified form of the invention;

Figure 13 is a fragmentary transverse section of the arrangement shown in Figure 12, taken on the line 13×—13× of the said Figure 12; and Figure 14 is a sectional detail view of the shift locking mechanism taken on the line 14×—14×, Figure 12.

Similar characters of reference indicate similar parts in the several figures of the drawings.

Figure 1:
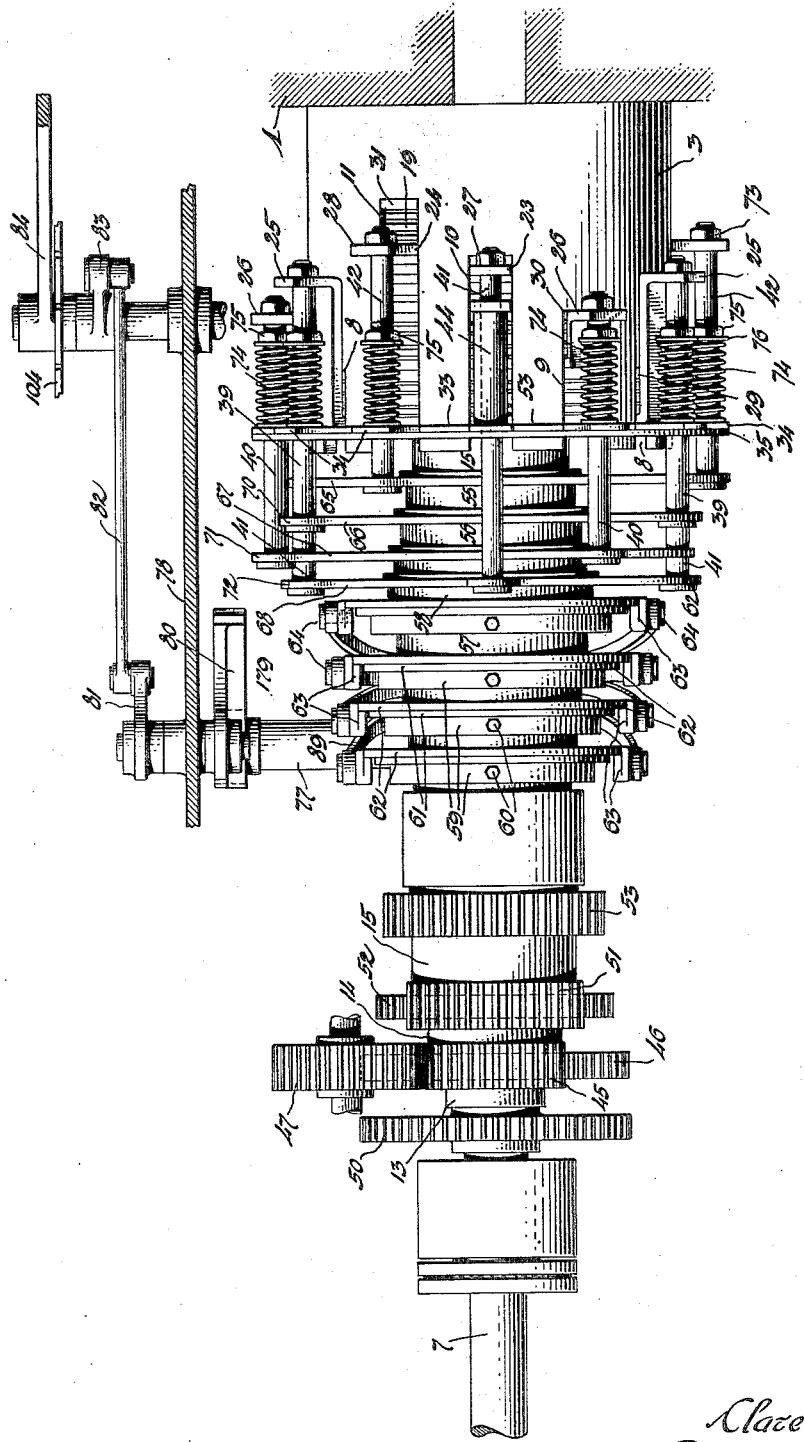

Secured to the flywheel 1 of an engine by bolts 2 is a clutch housing 3 which comprises a hollow cylindrical casing provided with an inner tubular boss 4 adapted to accommodate the bearings 5 and 6 of a propeller or transmission shaft 7. This clutch housing is provided with a plurality of longitudinal slots in its outer wall, which slots are of four different longitudinal dimensions and are numbered 8, 9, 10 and 11 respectively according to their increasing length, as may be readily seen from Figures 1 and 10 of the drawings, and 12 is an annular groove on the outer face and near the open end of the said clutch housing, for the reception of a locking ring 35.

Sleeved upon the shaft 7, one within the other, are tubular shafts 13, 14 and 15 of respectively decreasing length whereby the inner shafts project at either end beyond the outer shafts, and these shafts are provided at their forward ends with clutch disks 16, 17 and 18 respectively, 19 being a further clutch disk carried by the inner end of the shaft 7. These clutch disks are each provided with friction disks 20 loosely arranged on opposite sides thereof, and the said clutch disks are operably associated with plates 21, 22, 23 and 24 adapted by their movement to effect the engagement through their respective friction disks with the clutch disks 18, 17 and 16 or 19, as the case may be.

As will hereinafter become apparent the plate 24 and clutch disk 19, together with their friction disks, form the third or high speed clutch assembly; the plate 22 and clutch disk 17, the second speed clutch assembly; the plate 21 and the clutch disk 18, the first or low speed clutch assembly; and the plate 23 and clutch disk 16, the reverse drive clutch assembly.

The said plates 21, 22, 23 and 24 are provided with radial extensions 25, 26, 27 and 28, which are accommodated in the slots 8, 9, 10 and 11 respectively of the clutch housing and project substantially beyond the periphery of the said housing. The said extensions 25 and 26 are rearwardly offset as is clearly seen from an examination of Figure 1, in order that their end portions will be substantially removed from the rear open end of the clutch housing to provide room for the accommodation of springs, as will be further described.

It will also be noted that further immovable plates 29, 30 and 31 are provided, having peripheral abutments 32 thereon which rest in the inner ends of the said slots 8, 9 and 11, said plates 29, 30 and 31 forming partitions towards which the movable members of the adjacent clutches are adapted to be closed by their respective clutch plates 21, 22 and 24 when the said clutch plates are operated in the manner hereinafter described.

The forward end of the clutch housing is more or less enclosed by an end plate 33 which is in the form of a spider having radial arms 34 which extend through the slots of the clutch housing, and 35 is a locking ring adapted to pass over the end of the said housing and provided with internal teeth or abutments 36 which may be passed into the said slots and by rotation entered into the annular groove 12 of the clutch housing, the said locking ring being also provided with orifices 37 which, when the ring is rotated into locking position, coincide with orifices 38 in the radial arms 34 of the end plate 33.

The radial extensions of the clutch plates 21, 22, 23 and 24 are also provided with orifices in alinement with the orifices 37 and 38 of the said locking ring and end plate, whereby rods or bolts may be passed through such alined orifices and secured in such position, the said rods being numbered 39, 40, 41 and 42 according to their respective application to the plates 21, 22, 23 and 24.

It will be seen that the movable clutch plate 23 is disposed on the engine side of its respective clutch disk 16 as distinguished from the disposition of the other movable clutch plates on the opposite sides of their respective clutch disks, so that there is no fixed plate or partition provided in the inner ends of the slots 10 as in the other slots, but for a similar purpose a plate 43 is provided on the opposite side of the clutch disk 16 to the plate 23, this plate 43 being positioned by spacing tubes 44 mounted on the rods 41 and bearing against the arms of the end plate 33.

It will, therefore, follow that the closing movement of the clutch plate 23 must be in a rearward direction, whilst the closing movement of the plates 21, 22 and 24 is a forward one; and it may be explained that the reverse clutch assembly 16 and 23 is adapted when closed to transmit power through the shaft 13 to a gear 45 mounted on the rear end thereof and meshed with a gear 46 through an idler gear 47, which gear 46 is mounted on a shaft 48, which in turn is geared through the pinion and spur wheel 49 and 50 to the shaft 7 for the driving thereof. Similarly, the first speed clutch assembly, through the shaft 14, actuates the train of gears 51 and 52; and the second speed clutch assembly operates the train of gears 53 and 54 through the medium of the shaft 15. The third or high speed clutch assembly is adapted to directly drive the main shaft 7.

It will thus be seen that the selective closing of either of these clutches will determine through which of the gear trains power will be transmitted to the shaft 7, or the direct driving of the said shaft 7, and the method of effecting such selection will now be explained.

Nested one within the other around the outer shaft 15, are sleeves 55, 56, 57 and 58 of progressively decreasing length, so that each sleeve extends substantially beyond the ends of its surrounding sleeve, and each of said sleeves is provided at its rear end with a collar 59 threaded thereon and secured thereto by a set-screw 60, which collar locks a thrust ring 61 on each of the said shafts. Disposed immediately in front of each of these thrust rings are loose rings 62 formed with lateral rearwardly bent ear pieces 63 provided with laterally extending studs 64. The forward ends of the said sleeves 55, 56, 57 and 58 have secured thereto plates 65, 66, 67 and 68 which are provided with radially projecting ear pieces 69, 70 and 71 and 72 respectively, these ear pieces having orifices therein for the accommodation of the rear ends of the rods 42, 39, 40 and 41 respectively, the ends of which are enlarged to form abutments bearing against the rear faces of the said ear pieces and the forward ends of which are provided with nuts 73 securing them to their respective clutch plates. The rods 39, 40 and 42 have mounted thereon compression springs 74 which are secured in abutment with the forward faces of the radial arms of the end plate 33 by means of nuts 75 and washers 76 adjustably carried by the said rods, so that movement of the rods from their normal position of rest may be only obtained against the resistance of the said springs. In other words, the said springs serve to retain the clutch plates 21, 22 and 24 in closed relation to their respective clutch disks.

It will be obvious that the movement in a rearward direction, that is to say, away from the engine, of any of the members 62 will result in a similar movement of the corresponding plate or plates 65, 66, 67 or 68 and the consequent movement of the respective clutch plate or plates associated therewith by reason of the connections established by the said rods; and it will be further seen by an examination of the drawings that movement rearwardly of the plates 65, 66 or 67 must take place against the resistance of the springs 74, and will result in the declutching of one or other or all of the clutch disks 17, 18 or 19 forming part of the forward clutch mechanisms. Similar rearward movement of the plate 68, however, results in the closing of the reverse clutch assembly including the clutch disk 16, due to the arrangement of the movable plate 23 on the forward side of the said disk 16 as hereinbefore explained, so that this movement will bring into operation the reverse train of gears 45, 46 and 47.

The movement of the members 62 is effected through the agency of a rotatable shaft 77 suitably journaled in the outer casing 78 of the transmission mechanism which is provided with a shaft operating pinion 79 in mesh with a quadrant 80 operable, through the medium of a crank 81, connecting rod 82 and crank 83, by a foot pedal 84.

Mounted on the said shaft 77 are cams 85, 86, 87 and 88 adapted to successively actuate rocker arms 89, 90, 91 and 92 pivoted on a transverse shaft 93 with their lower ends adapted to be impinged by the said cams and their upper ends connected by the studs 64 to the ear pieces 63 of the members 62, whereby motion may be imparted from the cams through the said rocker arms to the clutch assemblies in the manner heretofore set forth.

The foot pedal 84 has as its extremity a rockable foot plate 94 connected by a rod 95 and bell crank 96 pivoted to a latch 97 which is adapted by the action of a spring 98 to engage in one or other of notches 99, 100, 101, 102 and 103 of a quadrant bar 104 for the purpose of retaining the said foot pedal in any one of five adjusted positions, the release of the said latch for the readjustment of the said foot pedal being effected by the pressing inwardly of the lower part of the foot plate 94 as will be quite apparent.

In operating the device, the foot pedal is simply moved from one to another of its five positions of adjustment according to the ratio of gear transmission desired, and in the drawings the foot pedal is shown as being in its extreme forward position, with the latch in engagement with the notch 103, and with the result that the quadrant 80 is also rotated to its extreme forward position and the cams rotated to their fullest extent, whereby all the cams are brought into active engagement with the rocker arms 89, 90, 91 and 92. Therefore, all of the plates 21, 22, 23 and 24 are moved to their rearward position, in which position of the said plates declutching of the disks 17, 18 and 19 is effected against the resistance of the springs 29 and the closing of the reverse clutch assembly including the disk 16 is effected. As this disk 16 is associated with the gear 45, it is obvious that with the foot pedal in the extreme forward position a reverse motion will be transmitted to the shaft 7.

Upon the release of the foot pedal and its retraction until the latch 97 engages the notch 102 the cam shaft will be rotated in the direction indicated by the arrow in Figure 2 until the cams 88 are disengaged from the lower free ends of the rocker arms 92, the remaining rocker arms being still actuated by the cams 85, 86 and 87 so that the clutch disk 16 will be released, and as the clutch plates 21, 22 and 24 are still maintained in declutched position by the action of the said cams 85, 86 and 87 against the resistance of the springs 29 the entire assembly is declutched and a neutral position of the parts is obtained.

Upon the further retraction of the foot pedal 84, until the latch engages the notch 101, the next cams 87 are also disengaged from rocker arms 92, thereby permitting the springs 74 of the plates 22 to close upon and effect the reclutching of the disk 17, whereby power is then transmitted therethrough to the first speed gear train 51 and 52. Similarly, when the pedal is still further retracted in stages until the latch engages the notch 100 and then the notch 99 of the quadrant 104, the cams 86 and 85 will be successively released from engagement with the rocker arms 90 and 89 respectively and the plates 21 and 24 will likewise be successively released so that their springs will move them to reclutching positions with respect to the clutch disks 18 and 19, thereby effecting the transmission of power first through the gear trains 53 and 54 and then directly through said disk 19 to the shaft 7 as the full retraction of the foot pedal is effected.

It will be apparent that, in the third or high speed adjustment, all of the clutches except the reverse clutch are engaged, and in the second speed adjustment both the first and second speed clutches are engaged, and to permit such simultaneous engagement of a plurality of clutches the gears 52 and 54 are provided with ratchet dogs 105 and 106 operable in the well known manner to permit the free action of the said gears when a higher gear is in operation. The said trains of gears therefore remain in constant mesh and do not require to be shifted or otherwise disengaged, so that, throughout the various clutch and declutching operations, the selected train of gears merely picks up and transmits power to the shaft 7, the gears of lower ratio merely idling due to the function of said ratchets.

The notch 103 may be omitted as it will be understood that as the reverse is not usually employed for extensive periods and as it may be thought desirable to maintain the reverse clutch mechanism in operative position by foot pressure the use of a retaining notch at this point is only a matter of expediency and not of necessity.

It is preferred that the neutral notch 102 be so shaped as by being square as shown, that it will offer a more or less positive stop in both directions to the movement of the foot pedal in order to ensure the operator bringing the parts into a fully neutral position before continuing into the reverse position.

Of course it may not always be considered necessary or desirable to carry out the invention to the full inclusion of a single pedal operated multiple clutch system as applied to an entire series of gears including the reverse gear in the manner described, as it is possible to modify the arrangement so that the reverse gear may be separately operated, whereby only a series of forwardly acting gears may be controlled in the described manner. In this way conditions as to operation which may not be adequately met by the single pedal control may be provided for and the scope of usefulness of the said invention therefore extended over practically the entire field of transmission, including automobiles, trucks, boats, lifting and hauling devices, and so forth; and as an example of such a modified construction, reference is directed to the arrangement shown in Figures 12, 13 and 14 of the drawings.

In this arrangement a clutch housing 107 is provided with longitudinal slots 108 and 109 in its outer wall, the slots 109 being deeper than the slots 108 and the housing being provided with a locking ring 110 and an end plate 111 corresponding to the plates 35 and 33 of the previously described arrangement.

This housing encloses a low speed clutch assembly comprising a fixed plate 112 resting in the bases of the slots 108, a movable plate 113, friction disks 114 and clutch disk 115 which is mounted upon a tubular shaft 116 sleeved on the propeller or transmission shaft 117; and a high speed clutch assembly comprising a fixed plate 118 resting in the bases of the slots 119, a movable plate 120 having friction disks 121 and clutch disk 122 which is directly mounted on the shaft 117.

The movable plates 113 and 120 are connected by the rods 123 and 124 respectively to the clutch operating plates 125 and 126 carried by the sleeves 127 and 128 with which are associated the rings 129 and 130. These rings are movable in the same manner as the rings 62, of the device originally described, by rocker arms 131 and 132 mounted on a transverse shaft 133, the lower ends of which arms are adapted to be actuated by cams 134 and 135 mounted on the shaft 136 which is rotatable through the medium of a pinion 137, quadrant 138, crank 139 and rod 140 which may be actuated in the same manner as the rod 83, with the exception that the actuating means need be only adapted to three positions of adjustment instead of five as in the first described arrangement.

The gearing comprises a pinion 141 mounted at the rear end of the hollow shaft 116, this pinion meshing with a ratchet gear 142 mounted on the shaft 143 which also has fixedly mounted thereon pinions 144 and 145, the latter of which meshes with an idler gear 146.

147 is a shiftable gear keyed to and slidably mounted on the shaft 117, whereby it is adapted to be moved by a forked arm 148 into engagement with either the pinion 144 or the idler gear 146 to secure a forward or a reverse drive of the said shaft 117, the intermediate position of the said gear 147 being free.

The clutch operation is similar to that described in connection with Figures 1 to 11, except that there are only two speeds.

Presuming that the gear 147 is engaged with the pinion 144, and that the cams are in the position illustrated in Figure 12, it will be seen that both the rocker arms being thereby operated, the two clutch assemblies are disengaged due to the pull upon the rods 123 and 124, so that the entire device is declutched and no power is transmitted. If however the quadrant be moved by the pedal operation as in the first described device to rotate the cams in the direction indicated by the arrow in Figure 12, throughout approximately a quarter of a revolution, the cams 134 will be disengaged from the rocker arms 131, thereby permitting the springs 149 to move the plate 113 forwardly, closing the low speed clutch assembly and resulting in the transmission of power through the tubular shaft 116 and gears 142, 144 and 147 to the main shaft 117 as required in a forward direction.

The further movement of the said cam will then result in the release of both rocker arms and consequent closing of both clutch assemblies due to the actuation then permitted of the springs 150 carried by the rods 124, in which case the main shaft will be directly rotated through the high speed clutch assembly and the ratchet nature of the gear 142 will become effective to take up the differential speed due to the direct operation of the main shaft.

The device illustrated in Figure 12 provides for a separate shifting operation to bring the gear into reverse and this is effected by means of a shift lever 151 actuating an arm 152 fulcrumed at 153, which arm is adapted to reciprocate a shift bar 154 mounted on the inside of a cover plate 155 of the transmission casing 156; and for reverse drive the shift bar is moved rearwardly until the gear 147 engages the idler gear 146, this movement being accomplished when both cams have been brought into engagement with the rocker arms and both clutch assemblies are thereby declutched as will be obvious.

The subsequent rotation of the cams through approximately a quarter of a revolution as indicated by the arrow then brings the low speed clutch assembly into operation as already explained and results in the driving of the shaft 117 in a reverse direction as will be well understood.

In this arrangement I also provide when thought necessary undesirable, special means for preventing the high speed clutch assembly being closed when the gear 147 is in mesh for reverse action with the gear 146, as it is usually undesirable, particularly in the case of vehicles, that reverse operation should be effected at high speed.

Part of the support of the bar 154 is in the form of an enlargement 157 on the underside of the cover plate 153, this enlargement being transversely chambered at 158 and 159 to accommodate spring pressed plungers 160 and 161 respectively, the latter being provided with a rod 162 which extends rearwardly to an arm 163 mounted upon a vertical shaft 164 journaled in suitable bearings extending from the side wall of the transmission casing.

The bar 154 is provided with V-shaped notches 165, 166 and 167 with which one or other of the said plungers may engage according to the adjustment of the bar, in the forward position of which bar the plunger 160 engages the notch 165 and thereby retains the gear 147 in engagement with the gear 144 for forward driving.

When the bar is moved to an intermediate position wherein the gear 147 is entirely free, the plunger 160 rides up the inclined face of the groove 165 and assumes the position illustrated in Figure 14, and the plunger 161 which was previously riding on the outer face of the shaft then engages under the influence of its spring in the notch 166, thereby pulling the arm 163 towards the bar 154 and effecting the rotation of the vertical rod 164 which in turn moves an arm 168 mounted thereon towards the quadrant 138. It will be seen that this quadrant is provided with an arcuate slot 169, the lower end of which is adapted when the quadrant is in the position illustrated in Figures 12, 13 and 14 (which is the neutral adjustment) to coincide with an abutment or roller 170 extending from the extremity of the arm 168 whereby, upon the movement described resulting from the engagement of the plunger 161 with the notch 166, this abutment will enter the said slot 169 ready to function in the manner about to be explained.

The said engagement of the plunger with the notch 166 maintains the gear 147 against accidental movement in the direction of either of the gears 144 or 146, and to set the gears for reverse drive the bar 154 is again moved rearwardly until the plunger 161 engages the notch 166, in which position the gear 147 then engages the idler 146, following which the cam shaft may be rotated to disengage the rocker arms 131 and bring about the closing of the low speed clutch assembly as already explained, whereupon reverse drive will take place.

The dimensions of the slot 169 are such that the abutment 170 of the arm 168 in this position of the parts engages the upper end of the said slot and therefore effectively prevents further movement of the quadrant 138 in the direction necessary to bring into operation the high speed clutch assembly, so that effective means are thereby provided for the prevention of the bringing of the mechanism into high gear when the gear 147 is shifted into its reverse position, and accidents which might otherwise occur were such provision not made are thereby avoided.

The last described arrangement of transmission mechanism it is thought will be more particularly applicable to ordinarily slow moving high powdered vehicles such as tractors, and also for lifting or haulage purposes where reverse operation is frequently resorted to and multiplicity of gear ratios is not required to the same extent as in high speed motor driven vehicles; and the general principles involved in both of the constructions described permit of an easy and positive changing of gear speed without complicated operation or danger of inaccurate or incomplete shifting of the parts so that the embodying of the said invention in any device to which it is applicable has a tendency to increase the life of the motor and of the device which the motor drives due to the freedom from strains such as are ordinarily set up where illtimed or inaccurate gear shifting takes place as in transmission mechanism hitherto generally employed.

This invention may be developed within the scope of the following claims without departing from the essential features of the said invention, and it is desired that the specification and drawing be read as merely illustrative and not in a limiting sense, except as necessitated by the prior art.

What I claim is:—

1. In a change speed power transmission device, gear trains for high and lower speed transmission, ratchet mechanism embodied in said lower speed gear train, said trains being in constant mesh, disc clutches associated with each of said gear trains, and selective means controlling the successive operation of said clutches, means positively retaining each clutch in inoperative position and relieving said selective means from the reactive pressure thereof during the operation of the succeeding clutches.

2. In a change speed power transmission device, gear trains for high and lower speed transmission, ratchet mechanism embodied in said lower speed gear train, said trains being in constant mesh, normally closed disc clutches associated with each of said gear trains, a plurality of cams adapted upon operation to selectively effect the progressive declutching of said clutches, a single lever bringing said cams into successive cam operating positions, and resilient means effecting the closing of said clutches as said cams are moved out of operative position.

3. In a change speed power transmission device, gear trains for high and lower speed transmission, ratchet mechanism embodied in said lower speed gear train whereby it may freely operate when power is transmitted through the high speed train, a disc clutch assembly associated with each of said trains, a cam adapted to declutch the high speed clutch assembly, a further cam adapted to declutch the lower speed clutch assembly whilst said first mentioned cam is still in operation, said cam being inactive when said clutches are closed, and means operating said cams.

4. In a device of the class described, a multiple gear selecting clutch mechanism comprising a housing, means partitioning said housing into clutch chambers, disc clutches in said chambers, one of which clutches controls a reverse gear and the other forward gears, movable plates controlling the operation of the forward gear clutches, a plate movable in the opposite direction controlling the operation of the reverse gear clutch, and means successively moving said plates in the same direction.

5. A device according to claim 4 resilient means effecting the clutching movement of said forward gear clutch plates and a series of cams adapted to effect the declutching operation of said plates and a further cam effecting the positive engagement of said reverse clutch following, the application of all of said cams for the disengaging the forward clutches.

6. In a change speed power transmission device, a rotary driving housing, means carried thereby partitioning said housing into chambers, a plurality of disk clutches located severally in said chambers, movable members arranged on the opposite sides of said clutches to said partitioning means and adapted to selective movement to cooperate with said partitioning means in the selective engagement of said clutches, the rotary housing being provided with longitudinal slots of different lengths in the inner ends of which the partitioning means are seated to form the clutch enclosing chambers, the movable plates being guided by the said slots.

7. In a change speed power transmission device, a rotary driving housing, means carried thereby partitioning said housing into chambers, a plurality of disk clutches located severally in said chambers, movable members arranged on the opposite sides of said clutches to said partitioning means and adapted to selective movement to cooperate with said partitioning means in the selective engagement of said clutches, one of the movable plates being adapted to effect the engagement of its clutch by a movement in an opposite direction to the engaging movement of the others of said plates, and means providing for the support of the cooperating partitioning means of said clutch against movement in the clutch engaging direction of its movable plate.

In testimony whereof I affix my signature.

CLARENCE PULLIAM.